(No Model.)
E. KRICK.
CHECK ROW ATTACHMENT FOR CORN PLANTERS.
No. 569,209. Patented Oct. 13, 1896.
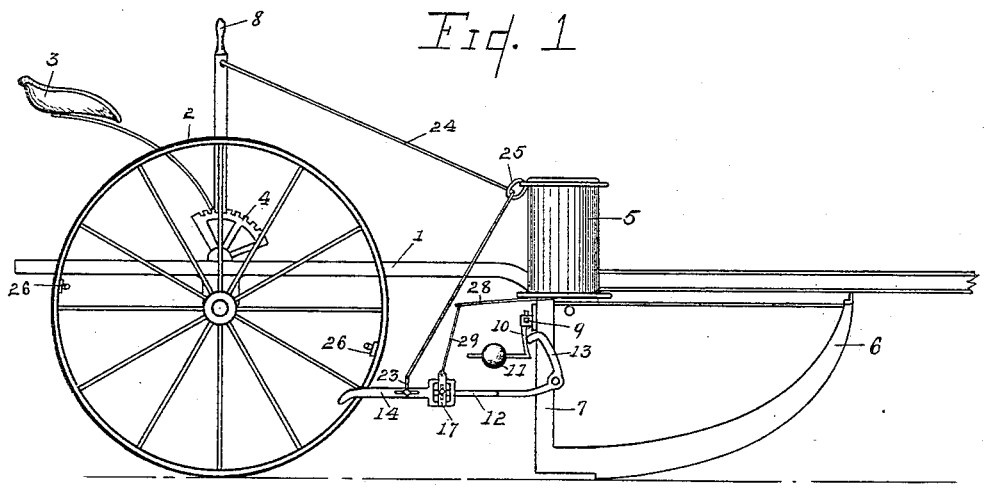
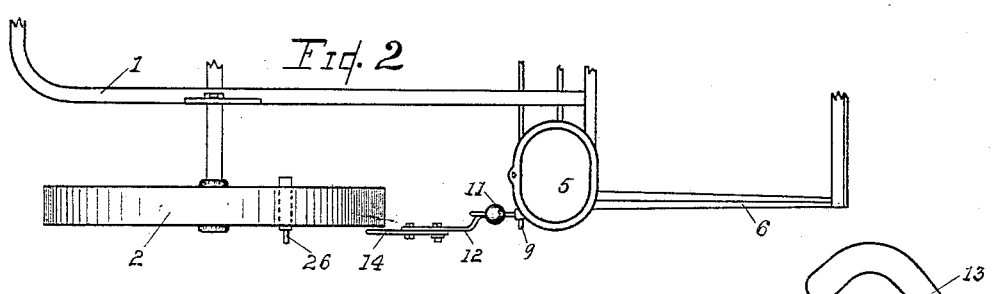
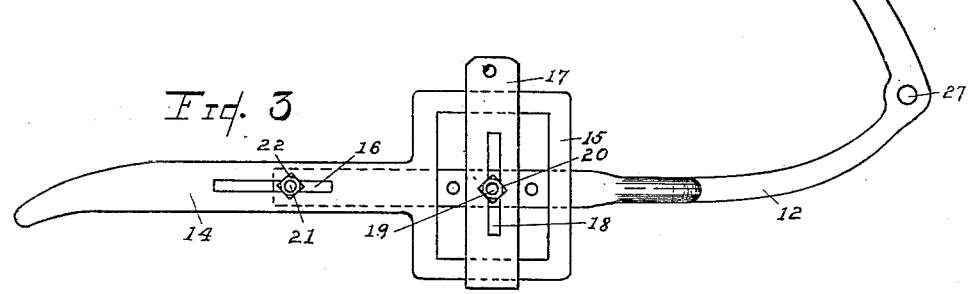
WITNESSES:
N. Webster Schlater
Alice M. Brugnot
Elijah Krick INVENTOR.
BY Chapin & Denny
his ATTORNEYS.

UNITED STATES PATENT OFFICE.

ELIJAH KRICK, OF WOLFCALE, OHIO.

CHECK-ROW ATTACHMENT FOR CORN-PLANTERS.

SPECIFICATION forming part of Letters Patent No. 569,209, dated October 13, 1896.

Application filed June 10, 1896. Serial No. 594,942. (No model.)

*To all whom it may concern:*

Be it known that I, ELIJAH KRICK, a citizen of the United States, residing at Wolfcale, in the county of Van Wert, in the State of Ohio, have invented certain new and useful Improvements in Check-Row Attachments for Corn-Planters; and I do hereby declare that the following is a full, clear, and exact description of the invention, which will enable others skilled in the art to which it appertains to make and use the same, reference being had to the accompanying drawings, which form part of this specification.

My invention relates to improvements in check-row attachments for corn-planters.

My invention comprises an extensible trip-arm pivotally mounted upon the rear end of one of the planting-shoes, having its forward end provided with an integral oblique arm adapted to oscillate the rock-shaft which controls the seed-dropping valves, a weighted pendent arm fixed on said shaft and adapted for actuating engagement with the forward end of said trip-lever, a pivotal horizontal arm from which the extended portion of the said trip-lever is suspended, and a plurality of markers or cams fixed upon the inner perimeter of the adjacent ground-wheel and adapted to successively engage the said trip-lever.

The object of my invention is to provide a simple and convenient attachment for corn-planters specially adapted for replacing the check-row chains, but also adapted by slight modification to be mounted upon any wheeled corn-planter; requires no chains, thereby lightening the load; requires less labor to operate, enabling the operator to start in at once to plant as soon as he enters the field, and enables him to plant more accurately and more rapidly than with the chains now in use. My improvement also enables him to readily plant among stumps or in a three-cornered field without the inconvenience experienced in the manipulation of chains.

In the accompanying drawings similar reference-numerals indicate corresponding parts throughout the several views.

Figure 1 is a side view of my attachment in position upon a two-wheeled corn-planter. Fig. 2 is a plan of the same with the greater portion of the planter-frame broken away. Fig. 3 is an enlarged detail of the adjustably-extensible trip-lever.

The planter-frame 1, of any proper construction, is supported by the ground-wheels 2 and is provided with a pair of furrow-opening shoes 6, of well-understood construction, provided with any proper seeding-tubes arranged in the upright portion 7 thereof in any proper manner. The said frame is also provided with a driver's seat 3 and a pair of hoppers or seed-receptacles 5, fixed upon said shoes and having in the bottom thereof proper valves for controlling the dropping of the seed, all of which features are old and require no particular description here. In proper bearings on the rear face of said shoe-standard 7 is loosely mounted the intermittently-movable rock-shaft 9, adapted in a well-known manner to open and close the said seed-dropping valves of the said hoppers. At or near one extremity of said shaft is rigidly fixed the pendent arm 10, having a rearward right-angular extension provided with a ball or weight 11, adjustably mounted thereon and adapted to cause the said shaft to promptly resume its normal position after each operation thereof, and also adapted to prevent its partial oscillation before the actuating engagement with the said trip-lever from any cause.

The trip-lever 12 is provided near its forward end with a perforation 27, adapted to loosely receive a proper fixed fulcrum-pin arranged upon the outer face and midway the ends of the said upright standard 7. The said rear end is also provided with an extension-plate 14, having at its mid-length the open head 15, adapted to support the vertical plate 17, transversely mounted on said head, having a longitudinal central slot 18. The said plate 17 is adjustably secured in position by the transverse bolt 19, the screw-threaded end of which is provided with a holding-nut 20. The rear portion of the said extension-plate is provided with a longitudinal slot 16, adapted to receive the adjustable bolt 21, having upon one end thereof the holding-nut 22. Both of said bolts are mounted in suitable perforations in the said lever 12. The said trip-lever 12 can thus be readily extended or contracted by removing the said bolt 19 and replacing it in the proper adjacent perforation therein, and also by adjusting the bolt 21 in the slot 16 on said plate 17, which has upon its lower end a lateral flange adapted to engage the lower edge of the head 15 of said plate 14 and has in its upper end a perforation in which is secured the lower end of the cord or rod 29. To a suitable lug (not shown) on the base of the said hopper 5 is pivotally fixed the horizontal rearwardly-projecting spring-plate 28, to whose free end the upper end of the said cord 29 is secured, by means of which spring-plate and cord the said lever 12 is automatically returned to its normal position after each operation. On the said bolt 21 is loosely mounted the vertical staple 23, to which is secured the lower end of the cord 24, which passes through a ring 25 on the top of said hopper 5 and whose upper end is secured to the top of the hand-lever 8. By means of this cord the said lever 12 can be readily elevated to swing clear of the wheel in turning round or to prevent its engagement with the actuating-markers when the operation of planting is not desired. Upon the inner perimeter of said wheel 2 are fixed a plurality of spaced markers 26, preferably two in number, consisting of proper blocks arranged flush with the tire of said wheel and projecting upon both sides thereof, the outer projection being adapted to consecutively engage the free adjacent end of said lever 12 upon the revolution of said wheel. The said cams 26 are adapted to also mark the rows and the location of the planted hills at the ends of the rows.

The operation of my improvement thus described will readily be understood, and, briefly stated, is as follows: The said markers 26 being properly spaced upon said wheel, which should of course be of the proper circumference to properly measure the space between the corn-hills, the said wheel is turned by hand at the end of each row to start in evenly. The said markers will leave their imprint distinctly upon the loose soil, and thereby mark each row. As each marker 26 successively engages the free end of the plate 14 on the lever 12 it will open the said seed-dropping valves by oscillating said rock-shaft 9 against the weight of the said pendent arm 10 and the weighted ball 11, thereby dropping the desired amount of seed at each operation. After each engagement of the markers 26 with the said trip-lever 12 the said spring-plate 28 and connecting-cord 29 will automatically return the said lever 12 to its normal position. When not in operation, the said lever 12 is elevated and secured out of engagement with said markers by means of the cord 24 and the hand-lever 8, to which the said cord is connected.

My improvement thus constructed and operated is simple, cheap, convenient, and avoids the objectionable use of check-row chains with their numerous inconveniences.

As will be seen, the seed-dropping valves are positively and simultaneously operated by the oscillation of the said rock-shaft under the actuating engagement of the said markers with the said trip-lever.

Having thus described my invention and the manner of operating the same, what I claim as new, and desire to secure by Letters Patent, is—

1. In a corn-planter of the class described, an extensible trip-lever 12 pivotally mounted as shown upon one of the planting-shoes, having its bent forward end 13 adapted to intermittently engage a fixed arm on the rock-shaft, and having its rear end provided with an extensible plate 14 slotted as shown for the purpose specified; a vertically-adjustable and centrally-slotted plate 17 arranged on said plate 14 as described and connected with the spring-plate 28 by the cord 29; the spring-plate 28 arranged as shown and adapted to normally return the said trip-lever to its normal position after each operation; in combination with the pendent arm 10 fixed upon one end of the said shaft 9 and immediately adjacent to the forward end of the said trip-lever, the said arm being provided upon its free end with a weighted ball for the purpose specified; and a plurality of markers 26 fixed upon the perimeter of the wheel and adapted to intermittently engage the said trip-lever, all substantially as described.

2. The combination in a wheeled corn-planter, of the planting-shoes 6; the seed-hoppers 5 mounted on said shoes, and provided in the base thereof with the seed-dropping valves; the oscillating rock-shaft 9 arranged as shown on said shoes; the pendent arm 10 fixed on one extremity of said shaft and provided with an adjustable weighted ball 11 for the purpose specified; a trip-lever 12 fulcrumed as shown upon one of the said planting-shoes, with its forward end adapted to intermittently oscillate the said shaft by engagement with the said arm 10, and having upon its rear end a slotted extensible plate 14 provided with the staple 23 and the vertically-adjustable plate 17; the spring-plate 28 fixed to the base of the said hopper 5, as shown and connected to the said plate 17 by the cord 29, for the purpose described; and a plurality of fixed markers 26 arranged on the wheel 2 as described and adapted to successively oscillate said shaft by engagement with the said trip-arm, all substantially as described.

Signed by me, at Fort Wayne, Allen county, State of Indiana, this 27th day of May, A. D. 1896.

ELIJAH KRICK.

Witnesses:
C. L. WALLIS,
R. C. BAXTER.